Mar. 13, 1923.
H. C. FRESE ET AL.
TOOL.
FILED FEB. 26, 1921.
1,448,622.
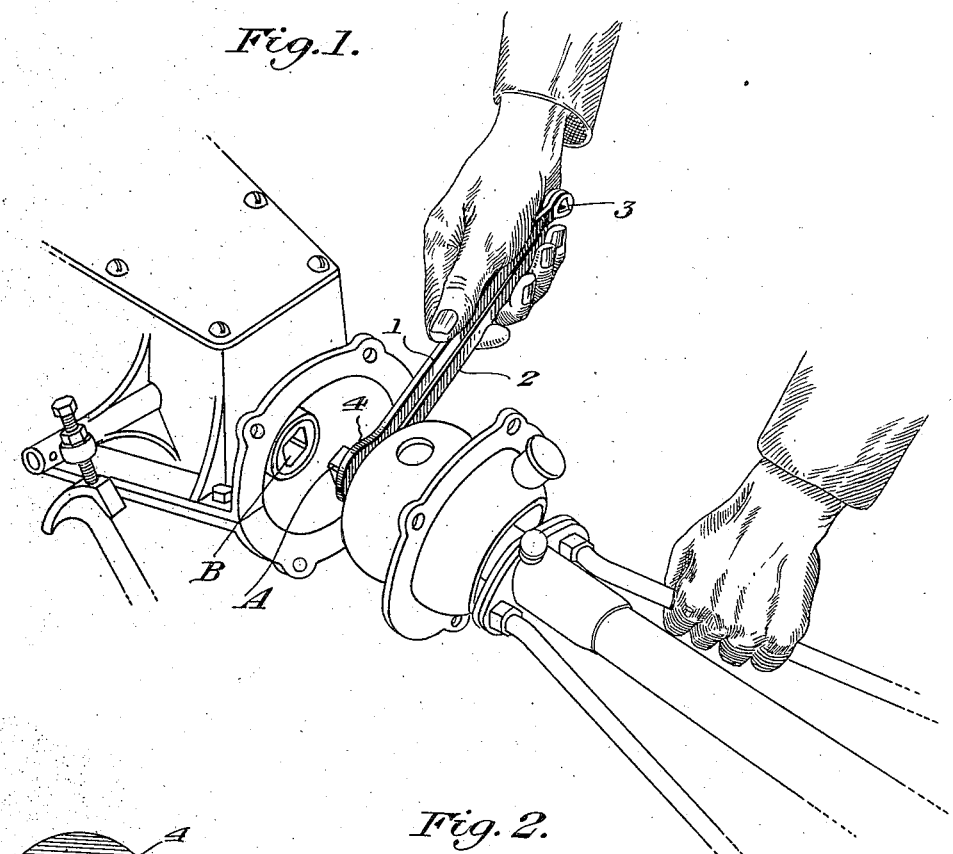
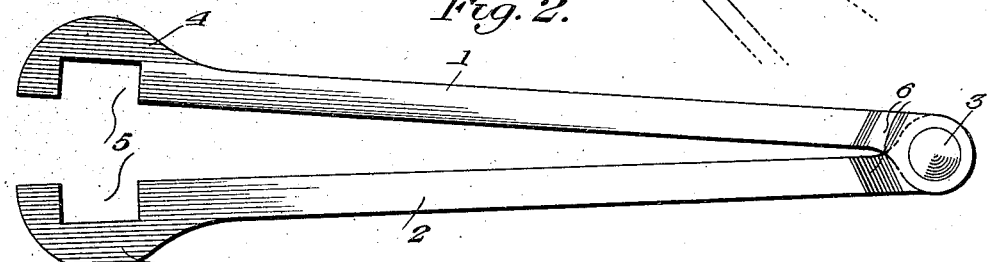
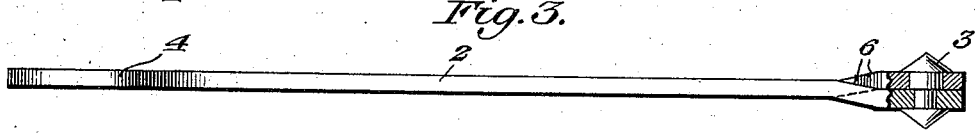
Henry C. Frese
Henry G. Moeller
INVENTOR
BY Victor J. Evans
ATTORNEY
WITNESS:

Patented Mar. 13, 1923.

1,448,622

UNITED STATES PATENT OFFICE.

HENRY C. FRESE AND HENRY G. MOELLER, OF READLYN, IOWA.

TOOL.

Application filed February 26, 1921. Serial No. 448,161.

*To all whom it may concern:*

Be it known that we, HENRY C. FRESE and HENRY G. MOELLER, citizens of the United States, residing at Readlyn, in the county of Bremer and State of Iowa, have invented new and useful Improvements in Tools, of which the following is a specification.

This invention relates to a tool for use in guiding the male member of a universal joint of an automobile into the female member, the principal object of the invention being to provide a tool which can easily be held in position gripping the male member and which can be easily released from said male member and withdrawn from the universal joint casing.

Another object of the invention is to make the tool of two parts, each part having a socket for receiving a portion of the male member with means for pivotally connecting the two parts together.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing how the device is used to guide the male member into the female member of a universal joint such as is used on the Ford type of automobile.

Figure 2 is a front view of the tool.

Figure 3 is an edge view.

As shown in these views the tool consists of a pair of members 1 and 2, pivotally connected together by the pin 3 and each having a rounded head part 4 which is provided with a rectangular recess 5, the two recesses forming a square space, when the parts are brought together, to receive the male member of the universal joint. The pivoted ends of the members are offset, as at 6, so that the major portions are in alignment and their inner edges will contact when the tool is grasped by the hand. The pin is preferably formed with two diameters and the hole in one member is made larger than the other hole, this arrangement of parts forming a hinge joint that will not bind.

As shown in Figure 1 the male member A is grasped by the tool, this member lying in the recess 5 in the tool. As the two parts of the universal joint are brought together the part A is directed into the socket B by the tool and as the tool is formed of thin material the two parts of the casing of the universal joint can be brought close together. The two parts of the tool are then separated so that said parts can be disengaged from the member A and pulled out of the casing and then the complete closing of the casing can be effected.

The connection of the two parts of a universal joint of the type shown in Figure 1 has been made with difficulty and usually takes a long time but with our tool the connection can be very quickly and easily made.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What I claim is:—

1. A tool for the purpose described comprising a pair of opposed parallel bars having recesses therein adapted to provide a shaft receiving opening at one extremity of the tool, and a pivotal connection between said bars at the opposite extremity of the tool.

2. A tool for the purpose described comprising a pair of opposed parallel bars having recesses in their opposed edges adapted to form a shaft receiving opening at one extremity of the tool, and extensions on said bars crossed and pivotally connected at the opposite extremity of the tool.

3. A tool for the purpose described comprising a pair of comparatively thin opposed parallel bars, enlarged portions on said bars adapted to form a head at one extremity of said tool having a shaft receiving opening therein, and extensions on said bars crossed and pivotally connected at the opposite extremity of the tool.

4. A tool of the class described having crossed portions at one end thereof provided with aligned openings of different diameters and a pivot pin having portions corresponding to the diameters of the openings in the crossed portions received in the openings for the purpose set forth.

In testimony whereof we affix our signatures.

HENRY C. FRESE.
HENRY G. MOELLER.